March 16, 1954   J. W. SPURZEM   2,671,962
DETACHABLE TOOL HANDLE
Filed Jan. 15, 1952
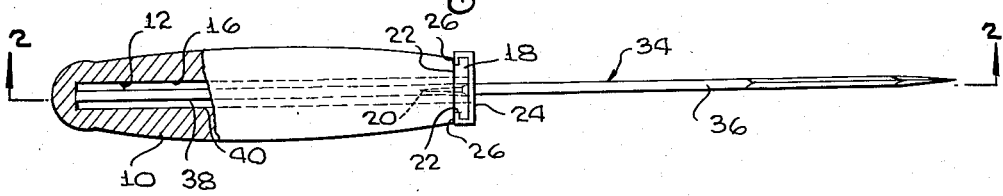
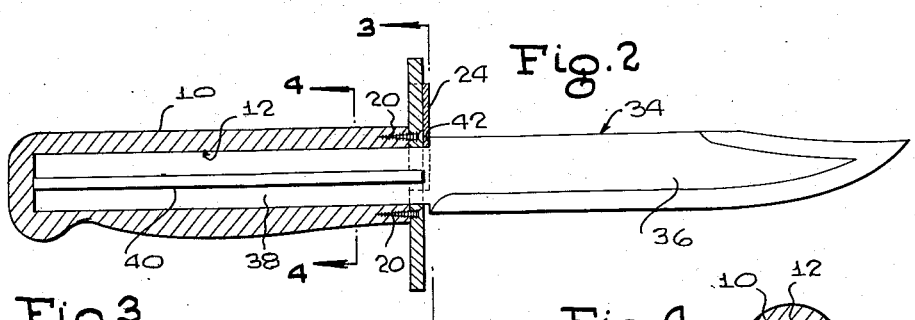
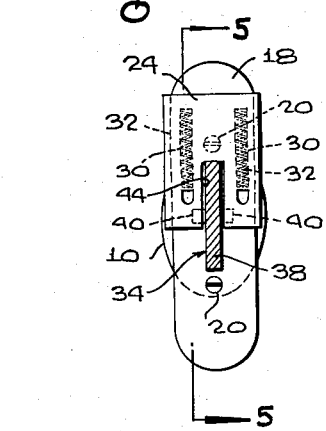
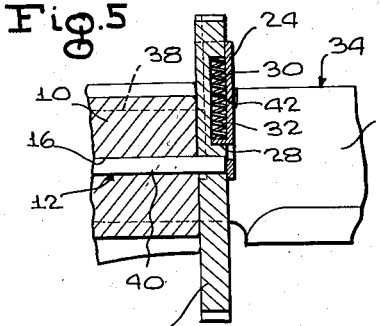
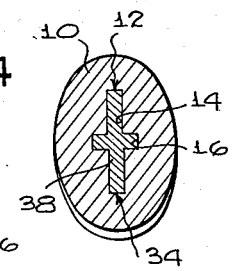
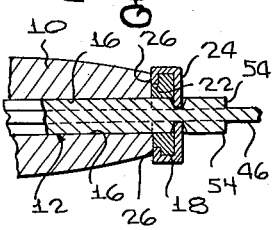
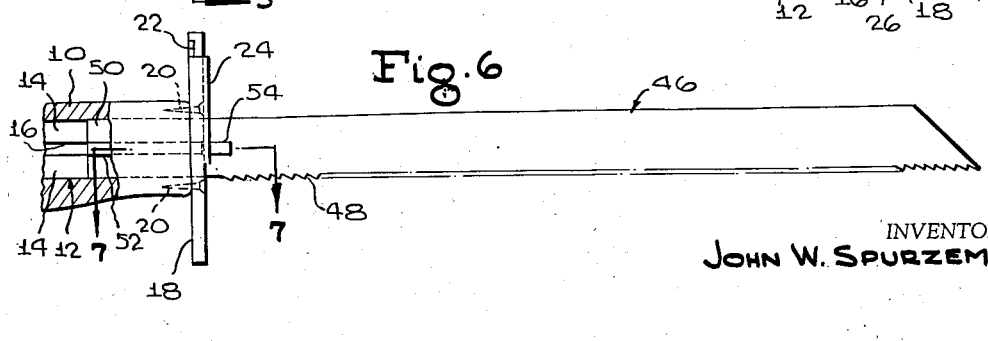
INVENTOR
JOHN W. SPURZEM
BY
McMorrow, Berman + Davidson
ATTORNEYS Patented Mar. 16, 1954

2,671,962

UNITED STATES PATENT OFFICE 2,671,962

DETACHABLE TOOL HANDLE

John W. Spurzem, Helena, Mont.

Application January 15, 1952, Serial No. 266,469

3 Claims. (Cl. 30—295)

1

This invention relates to hand tools, and more particularly has reference to a construction in a tool of this type wherein a tool member, such as a knife or saw blade can be readily separated from its associated handle.

The invention has many applications, and one particularly preferred application is a combination knife and saw which will be of particular value to hunters. Thus, by the provision of a tool wherein a knife blade can be substituted for a saw blade, and vice versa, one is enabled to use the knife blade for making easier the performance of many camping duties, while at the same time being provided with a saw usable for cutting up game, such as deer, elk, etc., these having many bony parts which are ordinarily chopped with a hatchet.

It is an important object of the present invention to provide a tool of the type stated which will be light, so as to occupy a minimum of space when one is on a hunting or camping trip.

Another important object is to provide a tool as described, wherein a selected blade can be associated with a handle in minimum time and with little difficulty, and can be removed from the handle with equal ease and speed for substitution of another selected blade.

Yet another important object is to provide a tool handle construction which will have general application not only for holding knife or saw blades, but also for holding various other types of tool members.

Still another important object is to provide a tool as stated wherein a locking means adapted to retain the tool member within its associated handle can be mounted directly upon a conventionally formed blade guard.

A still further object of importance is to provide, in a locking means of the character referred to, a construction which will effectively prevent accidental separation of the handle and tool member.

A further important object is to provide a tool of the category referred to that can be manufactured at relatively low cost, but will be nevertheless possessed of a high degree of durability.

Other objects will appear from the following description, the claims appended thereto, and from the annexed drawing, in which like reference characters designate like parts throughout the several views, and wherein:

Figure 1 is a top plan view of a tool formed in accordance with the present invention, a portion being shown in longitudinal section;

Figure 2 is a longitudinal sectional view taken substantially on line 2—2 of Figure 1;

2

Figure 3 is a transverse sectional view, on an enlarged scale, taken substantially on line 3—3 of Figure 2;

Figure 4 is a transverse sectional view through the handle, on an enlarged scale, taken on line 4—4 of Figure 2;

Figure 5 is a detail section through the locking means, taken substantially on line 5—5 of Figure 3, the scale being enlarged still further;

Figure 6 is a view similar to Figure 2, wherein a different blade has been substituted, a portion of the handle being broken away; and Figure 7 is a sectional view taken substantially on line 7—7 of Figure 6.

Referring to the drawings in detail, the tool construction constituting the present invention includes a handle 10 which, so far as its external configuration is concerned, is of substantially conventional appearance. The handle may be formed of any suitable material, and in accordance with the present invention is provided with a longitudinally disposed socket, generally designated 12, said socket opening upon one end of the handle. In the preferred construction of the handle (see Figure 4), the socket 12 is narrow in width, having flat, parallel side walls 14 slightly spaced apart.

Formed in the respective side walls 14 are oppositely disposed grooves 16, said grooves being extended from end to end of the socket 12.

A guard 18 is provided as a part of the handle, said guard being disposed transversely of the open end of the handle and projecting laterally in opposite directions from said end to afford protection for the user during cutting or sawing operations.

The guard 18 may be secured to the adjacent portion of the handle in any suitable manner, but in the present instance screws 20 are employed, said screws fixedly mounting the guard in its proper position.

As particularly well shown in Figures 1 and 7, the opposite side edges of the guard 18 are cut away, as at 22, to provide a slideway for a lock plate 24. The lock plate 24 straddles the guard 18 and is formed along opposite side edges thereof with inturned guide flanges 26 slidably engaged in the cutaway portions of the guard.

By reason of this construction, the lock plate is mounted for sliding movement upon the guard transversely of the handle and the selected tool member associated with said handle.

Spaced transversely of the lock plate 24, adjacent one end of the lock plate are abutments 28, these being struck inwardly in the direction of the guard 18 from the material of which the lock plate is formed. The abutments 28 engage, respectively, parallel springs 30, said springs being seated in recesses 32 formed in the outer face of the flat blade guard 18.

In Figures 1 through 6, there is illustrated one form of the blade which may be used with the handle 10, said blade being generally designated 34, and including a cutting portion 36 to be disposed exteriorly of the handle, and a shank portion 38. In this connection, although a knife blade has been illustrated to show one use to which the invention may be put, it will be understood that any type of tool member might be employed, if desired.

The portion 38 of the tool member 34 is formed to a cross-sectional shape complementing that of the recess 12 of the handle, and is provided with a pair of longitudinal ribs 40, said ribs constituting oppositely extended, lateral projections on the shank portion. Intermediate the opposite ends of the tool member there can be provided a shoulder 42 which, in some forms of the invention, can constitute a stop, whereby movement of the tool member inwardly of the socket 12 can be limited.

The slidable lock plate 24, as may be noted from Figure 3, is formed with a slot 44 opening upon one end of the lock plate, said slot providing a clearance permitting slidable movement of the lock plate transversely of the tool member in the inserted position of said tool member.

In use, the lock plate 24 is adjusted slidably upon the guard 18, said lock plate being shifted laterally and outwardly relative to the handle 10 against the action of the springs 30. This permits a selected tool member 34 to be inserted in the handle.

Thereafter, it is merely necessary to release the lock plate 24, whereupon the springs 30 will urge the lock plate in an opposite direction, thus to cause the lock plate to be shifted over the adjacent ends of the ribs or projections 40 of the shank portion 38.

As a result, the tool member 34 is fixedly assembled with the handle 10, and will be held against accidental separation from the handle by reason of the fact that the springs will retain the lock plate in the locking position thereof.

In Figures 6 and 7 I have illustrated a modified form of tool member, said tool member being generally designated 46, and constituting an elongated saw blade having a longitudinal series of saw teeth 48 formed upon one edge thereof.

The modified tool member illustrated in Figures 6 and 7 has a shank portion 50 substantially shorter than the shank portion 38 illustrated in Figures 1 through 6. However, it will be understood that the shank portion of each tool member can be of the same length as the corresponding portion of the other member.

In any event, the tool member 46 is formed with longitudinal ribs 52 corresponding to the ribs 40, said ribs 52 extending the full length of the shank portion 50 and constituting projections engageable by the lock plate 24 to prevent accidental separation of the tool member and its associated handle.

In the form of the invention illustrated in Figures 6 and 7, lugs 54 are provided, these being disposed exteriorly of the socket 12 in the inserted position of the tool member and being aligned longitudinally with the ribs or projections 52. The lugs 54 engage the outer face of the lock plate 24 when the lock plate is in its locking position, and assist in preventing undesired flexing of the saw blade during the use thereof.

It will be readily appreciated that a tool formed as illustrated and described herein can be of considerable value during hunting or camping trips, since the user can substitute one blade for another for performing various duties which may arise. Thus, the knife blade can be used for ordinary brush cutting, etc. Subsequently, if it is necessary to cut up game, such as deer or elk, the saw blade can be utilized for the purpose of cutting bony parts of the game not readily cut with a knife.

It is further thought to be an important characteristic of the invention that any blade can be removed from or inserted in the handle with considerable speed and ease, the blade in its inserted position being fixedly held and being securely retained against accidental removal.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A tool comprising a handle having a socket of non-circular cross-section opening upon one end of the handle, said handle including a flat guard extending transversely of said end and formed with straight, parallel side edges; a tool member formed separately from the handle and including a shank portion having a cross-sectional shape complementing that of the socket, for insertion of said portion in the socket; a lock plate having flanged side edge portions slidably engaged with said side edges of the guard, said plate sliding on the guard transversely of the socket and tool member between selected locking and unlocking positions; a projection on the shank portion, the lock plate extending across said projection to engage the same in the locking position of the plate to prevent withdrawal of said shank portion from the socket, said plate being spaced laterally of the projection to permit said withdrawal in the unlocking position of the lock plate; and a spring held under tension between the guard and lock plate and yieldably biasing the plate to the locking position thereof.

2. A tool comprising a handle having a socket of non-circular cross-section opening upon one end of the handle, said handle including a guard extending transversely of said end and having one face abutting thereagainst, the other face of the guard having a recess; a tool member formed separately from the handle and having a shank portion of a cross-sectional shape complementing that of the socket for insertion of said portion in the socket; a lock plate slidably mounted on the guard, said lock plate sliding in a direction transverse of the socket and tool member between selected locking and unlocking positions, said lock plate including guide flanges embracing opposite edges of the guard; a projection on the shank portion engaged by the lock plate in the locking position of said plate, said plate being spaced laterally of the projection when the plate is in its unlocking position, to permit withdrawal of said shank portion from the socket; and a spring positioned in said recess, said spring being held under tension between the guard and lock plate and exerting a continuous, yielding pressure biasing the lock plate to the locking position thereof.

3. A tool comprising a handle having a longitudinal socket formed with longitudinal grooves in opposite walls thereof and opening upon one end of the handle, said handle including a flat guard extending transversely of and having one face abutting against said end, the other face of the guard having a recess; a tool member formed separately from the handle and including a shank portion having a cross-sectional shape complementing that of the socket, for insertion of said portion in the socket, said portion having longitudinal ribs extending within said grooves; a lock plate slidably mounted on the guard, said plate sliding on the guard in a direction transverse of the socket and tool member between selected locking and unlocking positions, said lock plate including guide flanges embracing opposite edges of the guard, said plate extending across one end of the ribs when in its locking position to prevent withdrawal of said portion from the socket, said plate being spaced laterally of the ribs when in its unlocking position to permit said withdrawal; and a spring in said recess held under tension between the guard and lock plate and arranged to exert a continuous yielding pressure against the lock plate tending to bias the same to the locking position thereof.

JOHN W. SPURZEM.

References Cited in the file of this patent

UNITED STATES PATENTS

| Number | Name | Date |
| --- | --- | --- |
| 315,148 | Kriz et al. | Apr. 7, 1885 |
| 1,269,413 | Finnigan | June 11, 1918 |
| 2,018,603 | Case | Oct. 22, 1935 |

FOREIGN PATENTS

| Number | Country | Date |
| --- | --- | --- |
| 84,321 | Switzerland | June 1, 1920 |